(12) United States Patent
Shanmugasundaram et al.

(10) Patent No.: US 9,104,573 B1
(45) Date of Patent: Aug. 11, 2015

(54) PROVIDING RELEVANT DIAGNOSTIC INFORMATION USING ONTOLOGY RULES

(71) Applicant: Amazon Technologies, Inc., Reno, NV (US)

(72) Inventors: Satishkumar Kothandapani Shanmugasundaram, Chennai (IN); Venkatesh Kancharla, Chennai (IN)

(73) Assignee: Amazon Technologies, Inc., Reno, NV (US)

( * ) Notice: Subject to any disclaimer, the term of this patent is extended or adjusted under 35 U.S.C. 154(b) by 152 days.

(21) Appl. No.: 14/028,103

(22) Filed: Sep. 16, 2013

(51) Int. Cl.
*G06F 11/00* (2006.01)
*G06F 11/07* (2006.01)

(52) U.S. Cl.
CPC .................. *G06F 11/079* (2013.01)

(58) Field of Classification Search
CPC .............. G06F 11/079; G06F 11/3466; G06F 11/0778; G06F 11/0781
See application file for complete search history.

(56) References Cited

U.S. PATENT DOCUMENTS

| | | | |
|---|---|---|---|
| 6,598,179 B1 * | 7/2003 | Chirashnya et al. | 714/37 |
| 2004/0199828 A1 * | 10/2004 | Cabezas et al. | 714/39 |
| 2005/0283680 A1 * | 12/2005 | Kobayashi et al. | 714/39 |
| 2006/0184529 A1 * | 8/2006 | Berg et al. | 707/8 |
| 2008/0183704 A1 * | 7/2008 | Miller et al. | 707/6 |
| 2011/0154117 A1 * | 6/2011 | Danielson et al. | 714/37 |
| 2012/0143893 A1 * | 6/2012 | Abraham | 707/769 |
| 2014/0344622 A1 * | 11/2014 | Huang et al. | 714/37 |

* cited by examiner

*Primary Examiner* — Philip Guyton

(74) *Attorney, Agent, or Firm* — Schwabe Williamson & Wyatt PC

(57) ABSTRACT

Embodiments of methods, systems, and storage medium associated with providing diagnostic information are disclosed herein. In one instance, the method may include applying a pattern to a log line included in a log file accessible by the computing device, to determine whether there is a match between the log line and the pattern. The pattern may be one of a plurality of patterns included in a collection of previously accumulated diagnostic information including one or more relationship descriptions between the pattern and other ones of the plurality of patterns. The method may further include generating and storing one or more additional relationship descriptions in response to determination of a match for the pattern. The additional relationship descriptions may indicate connections between the matched pattern and at least some other patterns included in the diagnostic information. Other embodiments may be described and/or claimed.

22 Claims, 10 Drawing Sheets

PROVIDING RELEVANT DIAGNOSTIC INFORMATION USING ONTOLOGY RULES

BACKGROUND

As the use of computing devices and computer-based networks continues to expand, so does variety of applications that may be executed on computing devices. Ensuring proper performance of these applications and other device components may require substantial knowledge of applications' interactions with each other and device components, for example, operating system. When subject matter experts investigate issues (faults, errors, capacity shortage, and the like) associated with a computing device performance, they may record and store a log of their investigation activities associated with the issue. However, the knowledge that may be gained and captured by the subject matter experts during such investigations may not always be efficiently utilized by other subject matter experts investigating similar issues.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
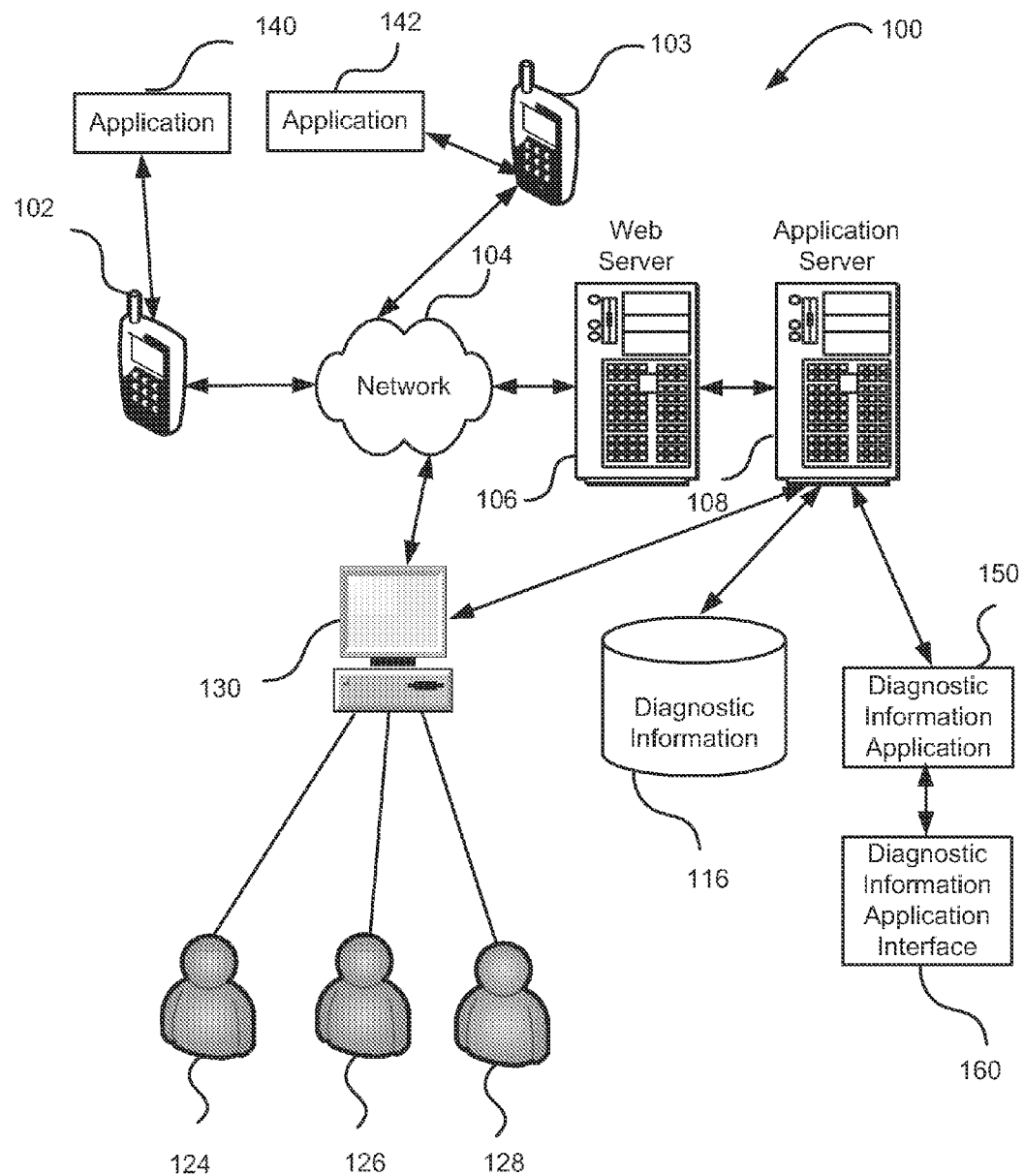
FIG. 1 is a block diagram illustrating components of a system for providing diagnostic information in accordance with various embodiments.

Techniques described herein provide relevant investigation information to a user investigating a computer issue based on matched patterns of computing device behavior in relation to computer issues occurred previously and captured as a result of multiple prior investigations, as well relationships between the matched patterns and other patterns.

For example, a subject matter expert (SME) investigating a computer issue may review a log file provided by the computing device in association with the occurred issue to a computing device diagnostic system. The issues may include various instances of faults, errors, performance slow-downs, application execution interruptions, and the like. The SME may investigate log lines in a log file that describe events occurred on a computing devices (e.g., events preceding the occurrence of the computer issue or otherwise pertaining to the computer issue). The SME may create patterns corresponding to the log lines describing particular events. The SME may define relationships between the created patterns, using relationship types that may be predefined. The SME may also create a description of an event corresponding to a particular pattern and a respective log line. The SME may submit a resulting record, i.e., diagnostic information pertaining to the investigated issue, to be stored, for example, in a data storage facility accessible by a diagnostic system (e.g., a diagnostic information application). A variety of different diagnostic information records associated with various computer issue investigations by different SME may accumulate over time in the data storage.

Assume an issue occurred at a computing device. The computing device may be configured to provide a log file for investigation by a user of the diagnostic information application. The diagnostic information application, operating on the same or a different computing device, may apply the patterns accumulated by the system to the log lines of the log file provided for investigation. As a result of the application of the patterns to the log lines, one or more patterns matching the log lines in the log file may be identified. If one (or more) of the stored patterns match the log lines in the log file, the diagnostic information application may identify the patterns that may relate to the matched pattern (or patterns). The diagnostic information application may generate additional relationships indicating connections among the related patterns and the matched pattern, based in part on the relationships between the patterns related to the matched pattern (or patterns) that have been stored in the diagnostic information. For example, the additional relationships may be generated using ontology rules.

The diagnostic information application may render the log file for user access, wherein the log lines that had a match with a stored pattern may be marked, denoting availability of diagnostic information. When the user accesses (e.g., selects) a marked log line, corresponding information (e.g., patterns related to the pattern that matched the marked log line, event descriptions, relationships between the patterns or corresponding event descriptions and the like may be selectively render to the user, in response to the user's request. Following a sequence of related events (patterns) the user may discover a root cause of the issue being investigated, and/or a solution to the issue.

FIG. 1 is a block diagram illustrating an example computing system 100 for a diagnostic information provision in which various embodiments described herein may be implemented. Although a Web-based environment is used for purposes of explanation, different environments may be used, as appropriate, to implement various embodiments. The system 100 may include one or more user computing devices 102, 103, which may be any appropriate device, such as, in some embodiments, a mobile wireless device, a laptop computer, an e-book reader, a tablet, a wearable device, among other possibilities. The computing devices 102, 103 may be configured to execute one or more applications 140, 142 (in some embodiments, residing on the computing devices 102 and/or 103). The user computing device may be connected to an application server 108 via a Web server 106 operating on a network 104. The network 104 may include any appropriate network, including an intranet, the Internet, a cellular network, a local or personal area network (e.g., Bluetooth®, near field communication (NFC), or Wi-Fi), or any other such network or combination thereof.

The system 100 may further include an application server 108 configured to operate a data storage location, such as a diagnostic information repository 116. The application server 108 may include any appropriate hardware and software for executing a diagnostic information application 150 or for providing the diagnostic information application for execution on a diagnostic computing device 130 connected with the application server 108, e.g., via the network 104 or other network (not shown). In some embodiments, the diagnostic information application 150 may include one or more modules that may include software and/or hardware components configured to perform the functions described herein. In some embodiments, the diagnostic information application 150 may reside on the diagnostic computing device 130.

Assume a computer issue (e.g., error) occurred, for example, during execution of the application 140 on the user computing device 102. For example, a fault may occur in the computer memory. In another example, emails provided to the user computer device may not be correctly synced up with the email server. In general, a computer issue may pertain to any component of a user computing device, be it a hardware component, a software component, or a combination thereof.

The computing device 102 may be configured to send a log file to the application server 108, which may render the log file for analysis by a SME 124 using the diagnostic information application 150. The SME 124, while investigating the issue, may create one or more patterns associated with events corresponding to the log lines in the log file, and create one or more relationships between the patterns. An event may be any computer-associated action documented by a corresponding log line.

For example, a log line may state "update metadata in the database for media file /file name/." The log line documented an event of updating the database for a particular media file. A pattern created for the log line may read "update metadata in the database for media file (file name)." Another log line may state "MTP invokes the scanner for file /file name/." A pattern created for this log line may read "MTP invokes the scanner for file (file name)." A relationship between the log lines (and corresponding events and patterns) may be such that the latter pattern precedes the former pattern. Accordingly, the relationship between the patterns may be entered as "MTP invokes media scanner for file" is followed by "MTP invokes the scanner for file." In some embodiments, the SME may enter a description of an event corresponding to a particular pattern and a respective log line. For example, the description for the log line "update metadata in the database for media file (file name)" may read "Media DB updated." The SME 124 may enter the created information into the diagnostic information repository 116, using, for example, a user interface (UI) 160 provided by the diagnostic information application 150.

Similarly, another computer issue may occur on the computing device 102 or another computing device 103 during execution of the application 140 or a different application. As described above, an issue may pertain to any component associated with the user computing device. For simplicity purposes, assume a computer issue occurred during execution of the application 142 on the user computing device 103. The computing device 103 may send a log file with the record of events (log lines) for analysis by a SME 124 or another SME 126 that may use the diagnostic information application 150. While analyzing the received log file, the SME 124 (126) may create one or more patterns associated with events corresponding to the log lines in the log file, and create one or more relationships between the patterns. The SME 124 (126) may enter the created information into the diagnostic information repository 116. As a result of multiple investigations of multiple computer issues occurred on multiple user devices (e.g., 102, 103), data comprising diagnostic information including the created patterns, event descriptions, and corresponding relationships may be accumulated in the diagnostic information repository 116.

Assume yet another computer issue occurred on one of the user computing devices (e.g., 102, 103 or another user computing device that is not shown for simplicity purposes). The user computing device may send a log file for investigation, e.g., by a user 128 of the diagnostic information application 150. The diagnostic information application 150 may be configured to apply the patterns stored in the diagnostic information to the log lines of the log file to identify a pattern or patterns that may match one or more log lines. For example, a pattern or a portion of the pattern may be compared with a log line of a portion of the log line. A particular match margin may be identified (e.g., predetermined) to establish a match between a pattern and a log line or portions thereof. In some embodiments, the margin may be predetermined to be about zero, i.e., a full match between the pattern and a portion of a log line may be required. In general, any pattern-matching technique may be used to establish a match between the pattern and the log line.

If a match between the pattern and the log line is found, e.g., with a predetermined match margin, the diagnostic information application 150 may identify the patterns that may relate to the matching pattern (or patterns). The diagnostic information application 150 may generate additional relationships indicating connections among the related patterns and the matched pattern, based in part on the relationships between the patterns related to the matched pattern (or patterns) that have been stored in the diagnostic information.

The diagnostic information application 150 may associate the identified patterns and corresponding relationships with the matched log line (and/or description of event indicated by the log line). The diagnostic information application 150 may render the log file for access by the SME investigating the issue. The rendered log file may include indicia denoting the event of the log line as having patterns and the additional relationships available for viewing to assist in diagnosing the issue. For example, if the SME selects or otherwise accesses the matched log line (or corresponding information), the related patterns (or corresponding information) along with the generated relationships will be rendered to the SME for viewing. The operation of the diagnostic information application 150 will be described in greater detail in reference to FIGS. 2-9.

Figure 2:
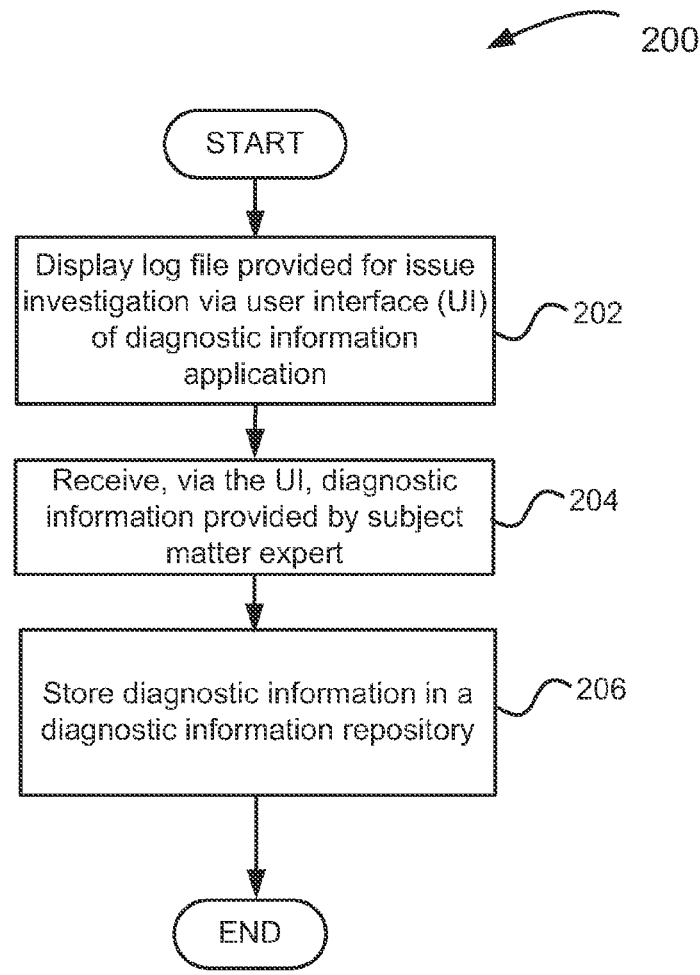
FIG. 2 is a process flow diagram illustrating a process for obtaining diagnostic information resulting from processing a computing device log file in accordance with various embodiments.

FIG. 2 is a process flow diagram illustrating a process 200 for obtaining diagnostic information resulting from processing a computing device log file by a SME as earlier described with reference to FIG. 1, in accordance with various embodiments. In some embodiments, the process 200 may be performed by the diagnostic information application 150 described in reference to FIG. 1.

The process 200 may begin at block 202, where the diagnostic information application 150 may provide a UI (e.g., 160) to a SME investigating a computer issue. In some embodiments, the UI may be provided in response to a request from a user (SME). For example, the SME may upload a log file from a computing device in order to investigate a computer issue using the diagnostic information application 150. The log file may be displayed to the SME via the UI 160 in a number of different ways, such as a list of log lines, in a timeline, or in other ways. In some embodiments, a log file may include a record documenting events (e.g., in a form of multiple log lines) that may take place in the execution of a system or application on the computing device in order to provide an audit trail that may be used to understand the activity of the system and to diagnose computer issues that may arise during the execution. FIGS. 3, 4, and 6-9 illustrate examples of the UI 160 components that may be provided by the diagnostic information application 150. The examples described herein are illustrative only and should not be considered as limiting to this disclosure.

Referring to FIG. 2, at block 204, the diagnostic information application may receive diagnostic information record as described in reference to FIG. 1. In some embodiments, the record may be entered via the components of the UI 160 provided by the diagnostic information application 150.

Figure 3:
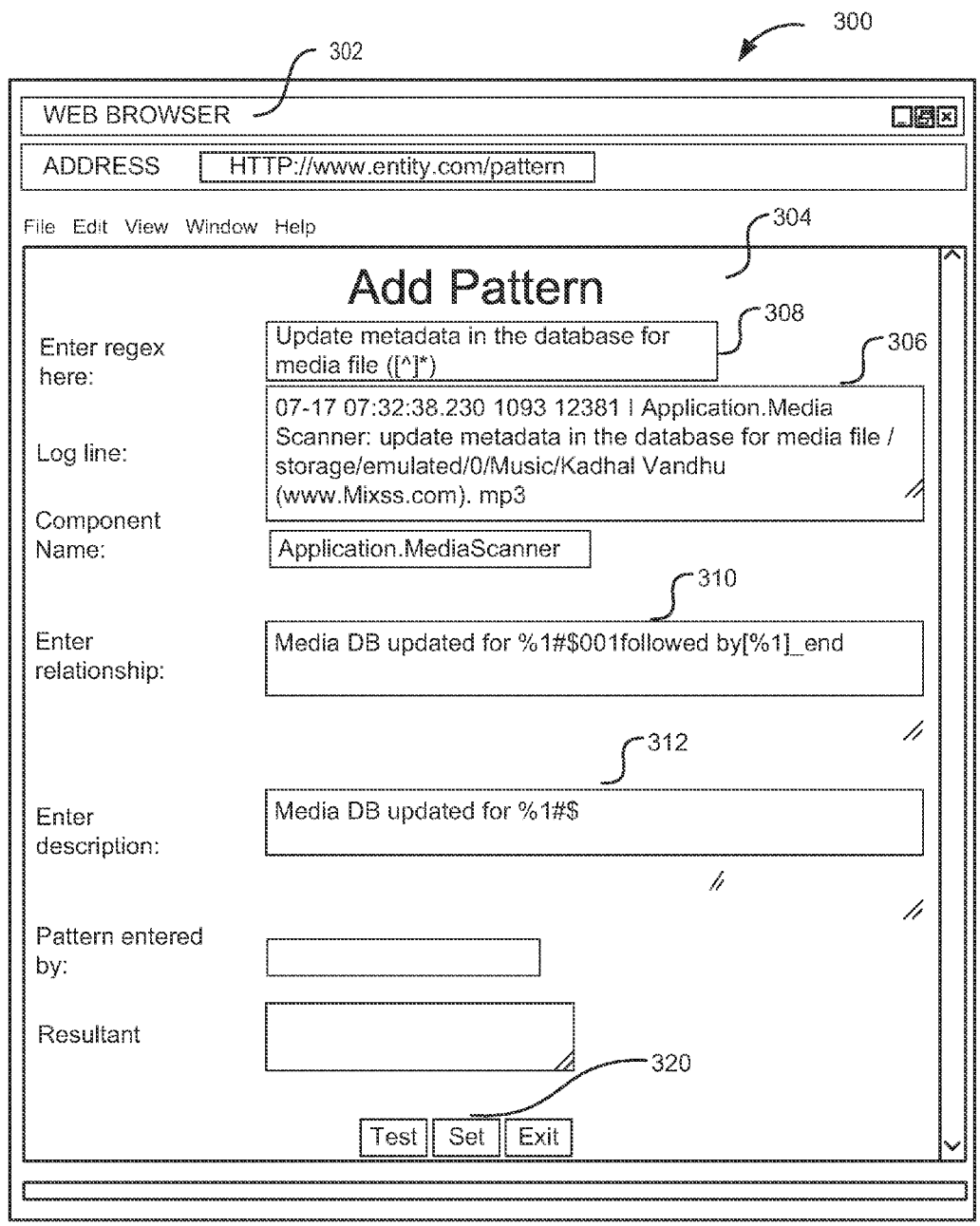
FIGS. 3-4 illustrate examples of the user interface provided by a diagnostic information application, in accordance with various embodiments.

FIG. 3 illustrates an example 300 of a UI component 304 in which a SME may enter a new pattern for a log line and create one or more relationships between the new pattern and other patterns, and provide an event description associated with the log line (and corresponding pattern). The example 300 may include a Web browser window 302 that may render the UI component 304 of the diagnostic information application 150 in a Web-based implementation. In other embodiments, different implementations of the application 150, which may not involve a Web implementation, may be contemplated.

Assume the SME wishes to create a pattern based on a particular log line. The SME may select a particular log line in the displayed log file and the selected log line may appear in the box 306. For example, the selected log line may be as follows: 07-17 07:32:58.250 1094 12381 I Application.MediaScanner: update metadata in the database for media file /storage/emulated/0/Music/Kadhal Vandhu (www.Mixss.com).mp3.

The SME may create a pattern, e.g., in a form of a regular expression (regex) and enter the created regex in the box 308. The pattern, based on the above log line, may be as follows: "update metadata in the database for media file ([^]*)." The created pattern may include a constant part (update metadata in the database for media file) and a variable part indicated by ([^]*). The constant part may remain the same for many instances of events (e.g., metadata update in the database) that have different variable parts (e.g., the files for which the metadata updates occur may be different). The constant part of the pattern may be used for pattern matching as will be described below in greater detail. The variable parts may be retrieved based on the variable part indications and used, for example, for display in a timeline view of a log file under investigation, as also will be described below. In some embodiments, the SME may create an event description corresponding to the log line. For example, the event description corresponding to the above log line may read "Media DB updated for %1#$." The SME may enter the event description in the corresponding box 312. Generally, an event description may include a brief description of an event indicated by a log line and a corresponding created pattern. For example, an event description may include a statement indicating a computer event described in a corresponding log line, such as, for example, "Socket connection timed out," "Download failure," "Reset command," "WiFi Service," and the like.

The SME may define a relationship between the patterns, for example, between the pattern created above and another pattern created based on another log line (e.g., a log line preceding the log line shown above). For example, another, second log line precedes in time the log line shown above (first log line) and reads as follows:

07-17 07:32:58.220 1094 12381 I Application.MediaScanner: mtp invokes the scanner for file/storage/emulated/0/Music/KadhalVandhu (www.Mixss.com).mp3. Accordingly, the pattern that the SME may create for this log line may be as follows: mtp invokes the scanner for file([^]*), where the constant part is "mtp invokes the scanner for file" and variable part is indicated by "([^]*)".

The SME may define a relationship between the patterns based on her understanding of what the relationship may be and further based on relationship types (e.g., relationship descriptions) that may be predefined by the diagnostic information application 150 and provided to the SME. There may be different ways of providing the relationship types. For example, the relationship descriptions (e.g., "followed by," "results from," and the like) may be provided via the UI 160 of the diagnostic information application 150, such as by way of a drop-down box or any other method.

In some embodiments, the SME may use a particular tool, such as a domain specific language (DSL), to define relationships between patterns using predefined relationship descriptions. Following the above example, the relationship between the first and second patterns, configured with the DSL, may read as follows (as shown in box 310): Media DB updated for %1#$001 followed by [%1]_end, where "followed by" is a relationship between the patterns corresponding to the DSL identifiers configured to invoke the related patterns (e.g., "#$001"). Similarly, a relationship between the second and first patterns may read as follows: Mediascanner invoked from MTP.<br> Found %1#$001 followed by [%1]_start.

In some embodiments, the SME may add indicia denoting an event of the log line, such as a tag or other information, to the diagnostic information being added. The tag may indicate a computing device component, issue, or activity with which the information being entered is associated. For example, for a kernel issue, the tag may indicate "kernel," for a memory issue the tag may indicate "memory," or may simply read "errors", and the like.

Figure 4:
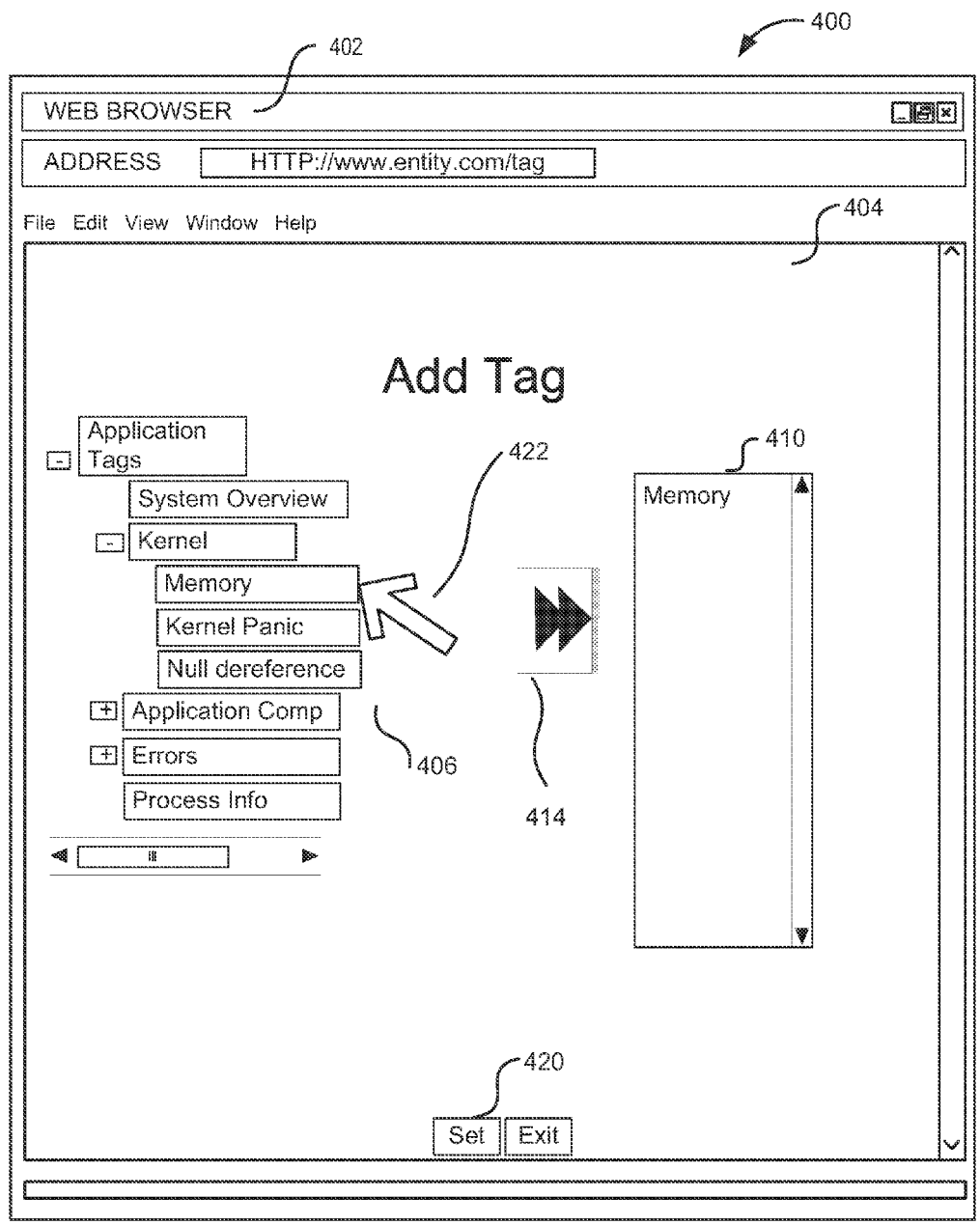

FIG. 4 illustrates an example 400 of a UI component 404 which may facilitate entering indicia denoting the event of the log line, e.g., a tag. The example 400 may include a Web browser window 402 that may render the UI component 404 of the application 150 in a Web-based implementation. In other embodiments, different implementations of the diagnostic information application 150, which may not involve a Web implementation, may be contemplated. There are many ways of tag creation and entering that may be contemplated. In the example illustrated in FIG. 4, the SME may select, e.g., with a cursor 422 or other selection-enabled tool (e.g., a stylus) an appropriate tag from the list of tags 406 and enter the desired tag into a window 410, for example, by using a selectable element indicated by 414.

Referring again to FIG. 2, once the SME enters diagnostic information as described above, the SME may enter (e.g., save) the entered information, for example, by selecting respective "save" or "set" selectable elements, such as 320 and/or 420 in FIGS. 3 and 4 respectively.

At block 206, the diagnostic information application 150 may store the diagnostic information entered by the SME as described above. The diagnostic information may be stored in a data repository (e.g., 116) and may be configured to be accessible by the diagnostic information application 150. Accordingly, as a result of multiple issue investigations and diagnostic information provided as described above, substantial diagnostic data may be accumulated in the diagnostic information repository 116.

The patterns, event descriptions, and relationships between patterns provided by multiple SMEs in connection with the computer issue investigations may be utilized by the users investigating computer issues using the diagnostic information application 150. In summary, the diagnostic information application 150 may be configured to receive, store, update, retrieve, and display to the user the patterns, event descriptions, and their corresponding relationships upon user request, as will be described below in greater detail.

Figure 5:
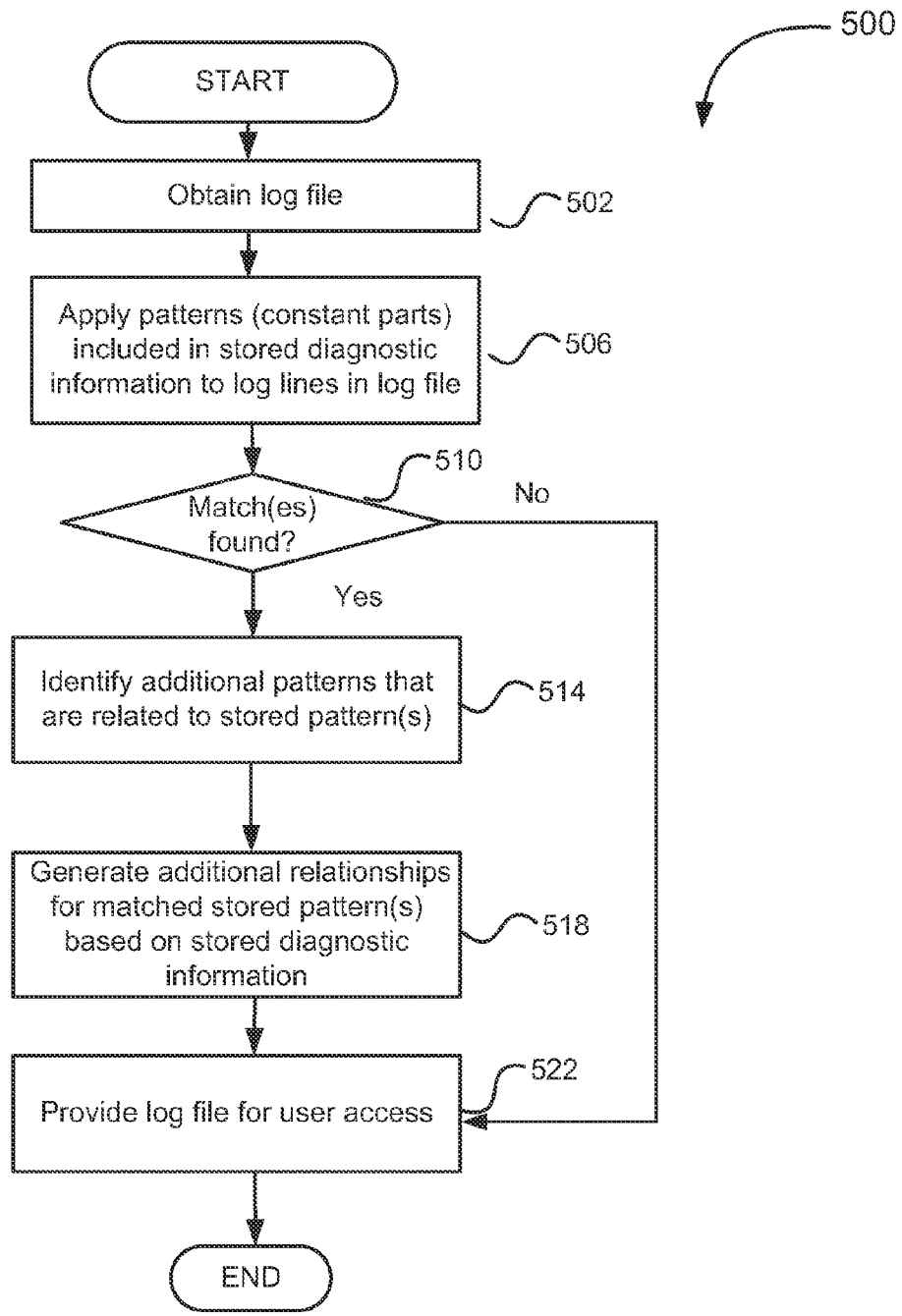
FIG. 5 illustrates a process flow diagram for providing diagnostic information in accordance with various embodiments.

FIG. 5 illustrates a process flow diagram 500 for providing diagnostic information in accordance with various embodiments. In some embodiments, the process 500 may be performed by the diagnostic information application 150, described in reference to FIG. 1. The process 500 may begin at block 502, where the diagnostic information application 150 may obtain (e.g., receive access to) a log file to be investigated in relation to a particular computer issue. The log file may be recorded and provided by a computing device that was experiencing a computer issue, for example, any computing device (e.g., user computing device 102 or 103) that may have access to, or accessible by, the diagnostic information application 150.

At block 506, the diagnostic information application 150 may retrieve the patterns stored with the diagnostic information in diagnostic information repository 116 resulted from multiple computer issue investigations and apply the patterns to each log line in the obtained log file. As descried above, each log line in the log file may correspond to a particular event occurring at the computing device and associated with a particular component (software, hardware, or a combination of both) of the computing device. The patterns may be applied to the log lines in order to identify one or more log lines that may match one or more patterns from the diagnostic information stored in 116. In some embodiments, the constant parts of the regexes defining a pattern may be applied to the log lines in order to identify a match.

At decision block 510, the diagnostic information application 150 may determine whether any matches between the applied patterns and the log lines of the log file are found. The matching may be implemented using, for example, parsing algorithms configured to parse the regexes corresponding to the patterns, separate the constant and variable parts, and match the constant parts to the log lines of a log files. These algorithms are not the subject of the present disclosure.

If no matches are determined to be found, the process 500 may move to block 522, where the log file may be provided for user access, for example, via a user interface associated with the diagnostic information application 150.

If at least one match between a pattern (e.g., a constant part of the pattern) and a log line of the log file is found, at block 514 the diagnostic information application 150 may identify additional patterns in the diagnostic information that may be related to the matched pattern or patterns. For example, if a matched pattern is pattern B, the diagnostic information application 150 may identify other patterns that are related to the matched pattern B. For example, the diagnostic information may include an entry indicating that pattern A is related to pattern B, and pattern B is related to pattern C. In this case, patterns A and C may be identified as ones related to pattern B.

At block 518, the diagnostic information application 150 may generate additional relationships for the matched pattern (or patterns) based in part on the relationships between the patterns that were included in the diagnostic information, where the additional relationships may indicate connections between the matched pattern (or patterns) and other patterns included in the diagnostic information. These additional relationships may be associated with the matched pattern (and corresponding log line) and provided to the user, e.g., upon user request as described below.

In some embodiments, the diagnostic information application 150 may be configured to define additional relationships using ontology rules. In some embodiments, ontology rules may include a set of concepts (e.g., expressed in formalized fashion) that may represent various entities or events (e.g., events corresponding to log lines in a log file or patterns created from the log lines) and define relationships between these events. For example, ontology rules may define relationship types between different events, e.g., the rules may specify that one event follows another, or one event results from another, and so on. The ontology rules may be created and combined in the ontology rules engine. The ontology rules may be created empirically or in a computerized fashion. The ontology rules may be defined based on known characteristics associated with different relationships. The ontology rules may be created using formal languages, for example, one of a family of Web Ontology Languages® (OWL). Based on the ontology rules, ontology classes may be created for particular patterns.

For example, the relationships defined by ontology rules may include ancestral relationships, transitory relationships, and so on. Ancestral relationships may include relationships between "parent" and "children" events, for example, define relationships between events following one another. Transitory relationships may include relationships between different events that may have one common event.

As an example of ancestral relationship, if event B results from event A, the ontology rule may define that B is caused by A or that A is followed by B. As an example of transitory relationship, if A is related to B, and B related to C, the ontology rule may define that A is related to C. Accordingly, based on ontology rules, the diagnostic information application 150 may be configured to generate relationships across different patterns.

Following the above example, the diagnostic information application 150 may be identify patterns A and C may as ones related to pattern B based on the diagnostic information entries indicating that pattern A is related to pattern B, and pattern B is related to pattern C. Here, pattern B may be identified as a "common pattern," i.e., a pattern that is related to both A and C. The diagnostic information application 150 may identify relationship descriptions defining relationships between the common pattern B and the C and the common pattern B and A provide a relationship description between the patterns A and C based on the identified relationship descriptions and predefined relationship types indicated by the ontology rules.

At block 522, the diagnostic information application 150 may provide the log file with the associated patterns with corresponding additional relationships associated with the matched log line(s) for user access, e.g., via the UI 160 of the diagnostic information application 150. The log file may be provided for user access via the UI 160 of the diagnostic information application 150 in a number of different ways, some of which are illustrated in FIGS. 6-9.

Figure 6:
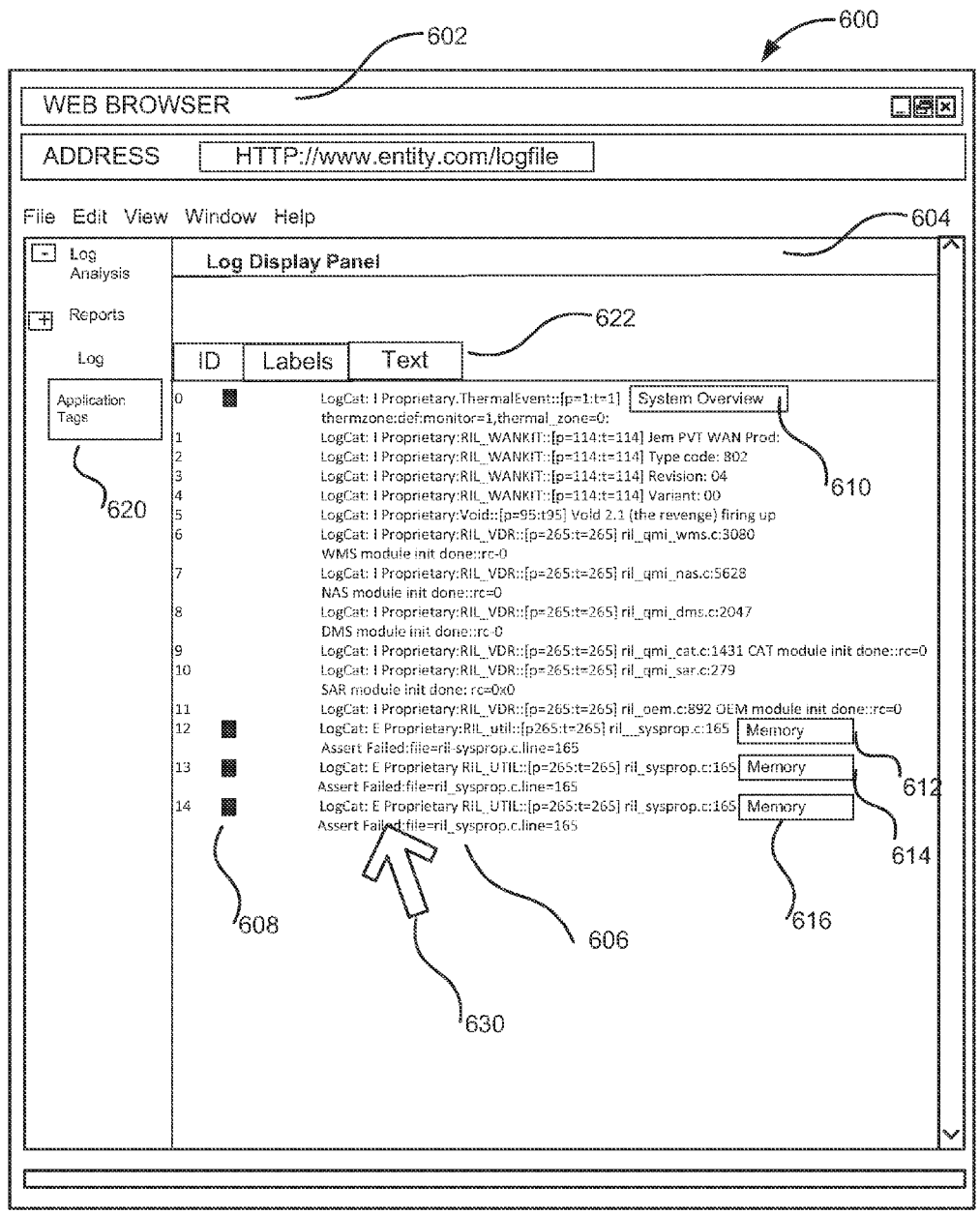
FIGS. 6-9 illustrate more examples of the user interface provided by the diagnostic information application, in accordance with various embodiments.

FIG. 6 is an example 600 of the UI 160 of the diagnostic information application 150, in accordance with some embodiments. More specifically, the example 600 illustrates a log view provided by the UI 160 of the diagnostic information application 150.

The example 600 may include a Web browser window 602 that may render the UI 160 of the diagnostic information application 150 in a Web-based implementation. In other embodiments, different implementations of the diagnostic information application 150, which may not involve a Web implementation, may be contemplated. The example 600 may include a file log display panel 604 displaying the log lines 606 (e.g., numbered from 0 to 14) of the log file being displayed. The log lines that were found matched to the patterns stored with diagnostic information may be marked (e.g., indicated by black squares 608) for user viewing convenience. In some embodiments, the matched log lines may have further indicators retrieved from the information associated with the matched patterns. For example, the matched log lines may be shown with the tags corresponding to the matched patterns. To continue with this example, the log lines 0, 12, 13, and 14 include, along with the long line itself, an indication of a match to a pattern associated with the diagnostic information and the tags 610, 612, 614, and 616 respectively. As will be appreciated, many other user interface components (e.g., buttons, drop-down windows, tabs, and other widgets and selectable elements) may be also used in order to provide desired navigation experience for the user. Some of the user interface elements are indicated by the numerals 620, 622.

Figure 7:
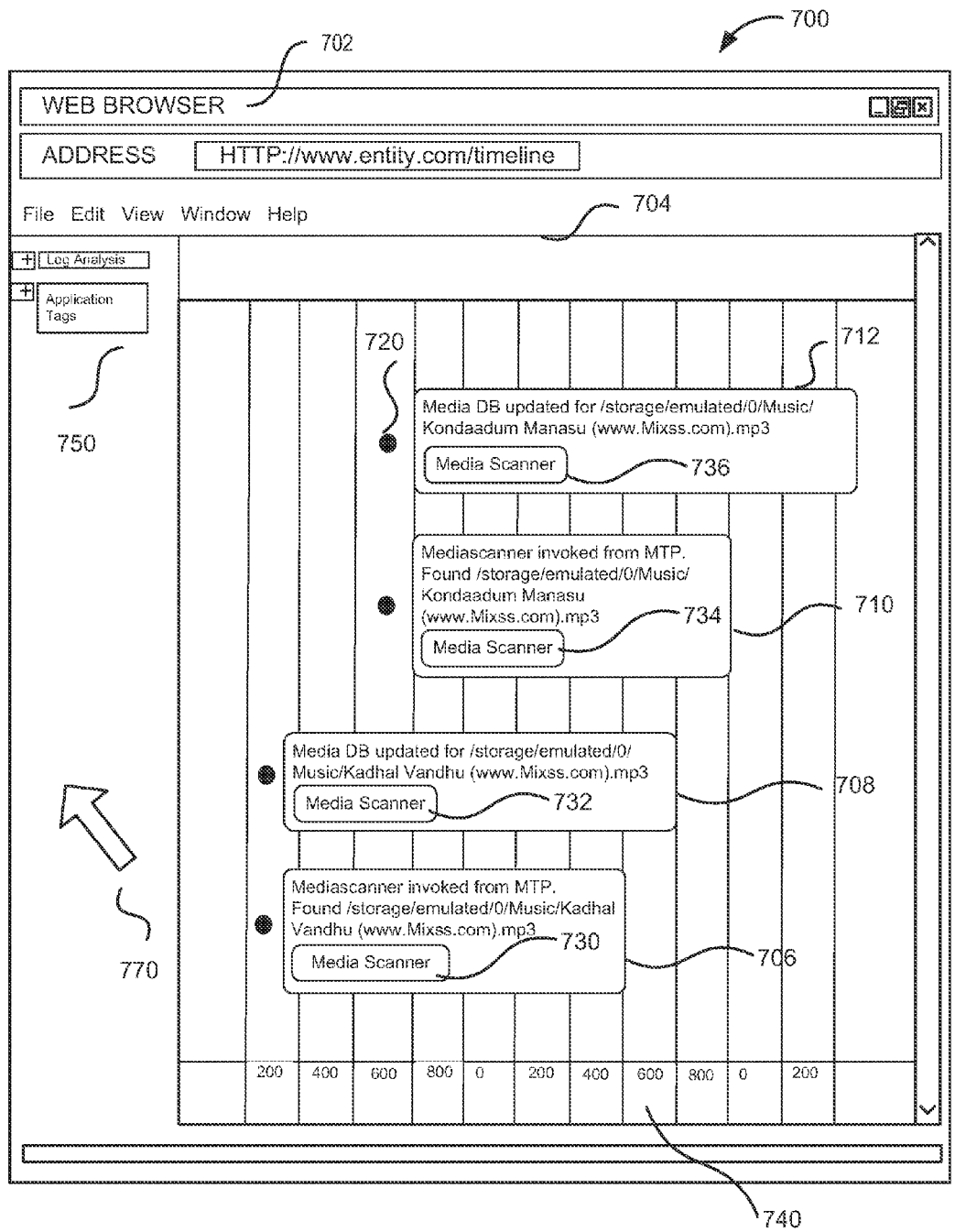

FIG. 7 is another example 700 of the UI 160 of the diagnostic information application 150, in accordance with some embodiments. More specifically, the example 700 illustrates a timeline view provided by the UI of the diagnostic information application 150.

The example 700 may include a Web browser window 702 that may render the UI of the diagnostic information application 150 in a Web-based implementation. The example 700 may include a file log display panel 704 displaying the log lines or information corresponding to the log lines (e.g., descriptions of the event) that have been found to match the patterns in the diagnostic information, referring to decision block 510 of FIG. 5. For example, the log lines corresponding to the numerals 706, 708, 710, 712 of the log file have been found to match the patterns in the diagnostic information described above in reference to FIG. 2. In the illustrated example, the log lines corresponding to the numerals 706 and 710 were found to match the constant part of the regex (pattern) "mtp invokes the scanner for file ([^]*)." The log lines corresponding to the numerals 708 and 712 were found to match the constant part of the regex (pattern) "update metadata in the database for media file ([^]*)." The corresponding information may include, for example, the descriptions of events (e.g., Media scanner invoked from MTP or Media DB updated for). In some embodiments, the information may include the respective log lines, similarly to the example illustrated in FIG. 6.

In some embodiments, the information may include constant and corresponding variable parts of the respective patterns. For example, as shown in FIG. 7, the information may indicate the files for which the media scanner was invoked and media database was updated. For example, for the description "Media DB updated for %1#$" described in reference to FIG. 3, the value %1 may be replaced with a corresponding variable part "/storage/emulated/0/Music/Kadhal Vandhu (www.Mixss.com).mp3." The resulting information may be displayed to the user as shown by 708. It will be appreciated that different information may be displayed in addition to, or in the alternative, the one described above.

In some embodiments, different types of indicators marking the matched log lines (or corresponding information) may be included in the timeline view and displayed along with the information indicated by the numerals 706, 708, 710, 712. In this example, black dots 720 are used to indicate that the displayed information corresponds to the log lines that were found to match the patterns in the diagnostic information. In some embodiments, the tags corresponding to the matched patterns may be displayed in association with the matched log lines or corresponding information 706, 708, 710, 712. In this example the tags are indicated by the numerals 730, 732, 734, and 736. As shown, the information indicated by 706, 708, 710, 712 may be displayed in an order of occurrence, i.e., in a timeline fashion. A timeline calibrated with time units (e.g., microseconds) is indicated by the numeral 740. As shown, the events indicated by the log lines corresponding to the numerals 706, 708, 710, and 712 occurred in a particular order: 706, then 708, then 710, and then 712.

As will be appreciated, many other user interface components (e.g., buttons, drop-down windows, tabs, and other widgets and selectable elements) may be also used in order to provide desired navigation experience for the user. For example, the tags menu 750 may be displayed to help the user navigate the panel 704. For example, if a particular tag is selected from the menu 750, the view in the panel 704 may be sorted by the selected tag.

As noted, the user may access the patterns with corresponding additional relationships for viewing, e.g., upon request. For example, the user may check whether a computer issue being investigated relates to a particular log line that has a matched pattern in the diagnostic information. The user may access (e.g., select with a cursor 630 (770)) a log line (or corresponding information) in the provided UI view (e.g., log view of the example 600, timeline view of the example 700, or other views for which the UI may be configured). In response, the matched pattern, the patterns corresponding to the matched pattern, and their relationships as generated at block 518 (FIG. 5) may be shown to the user.

Figure 8:
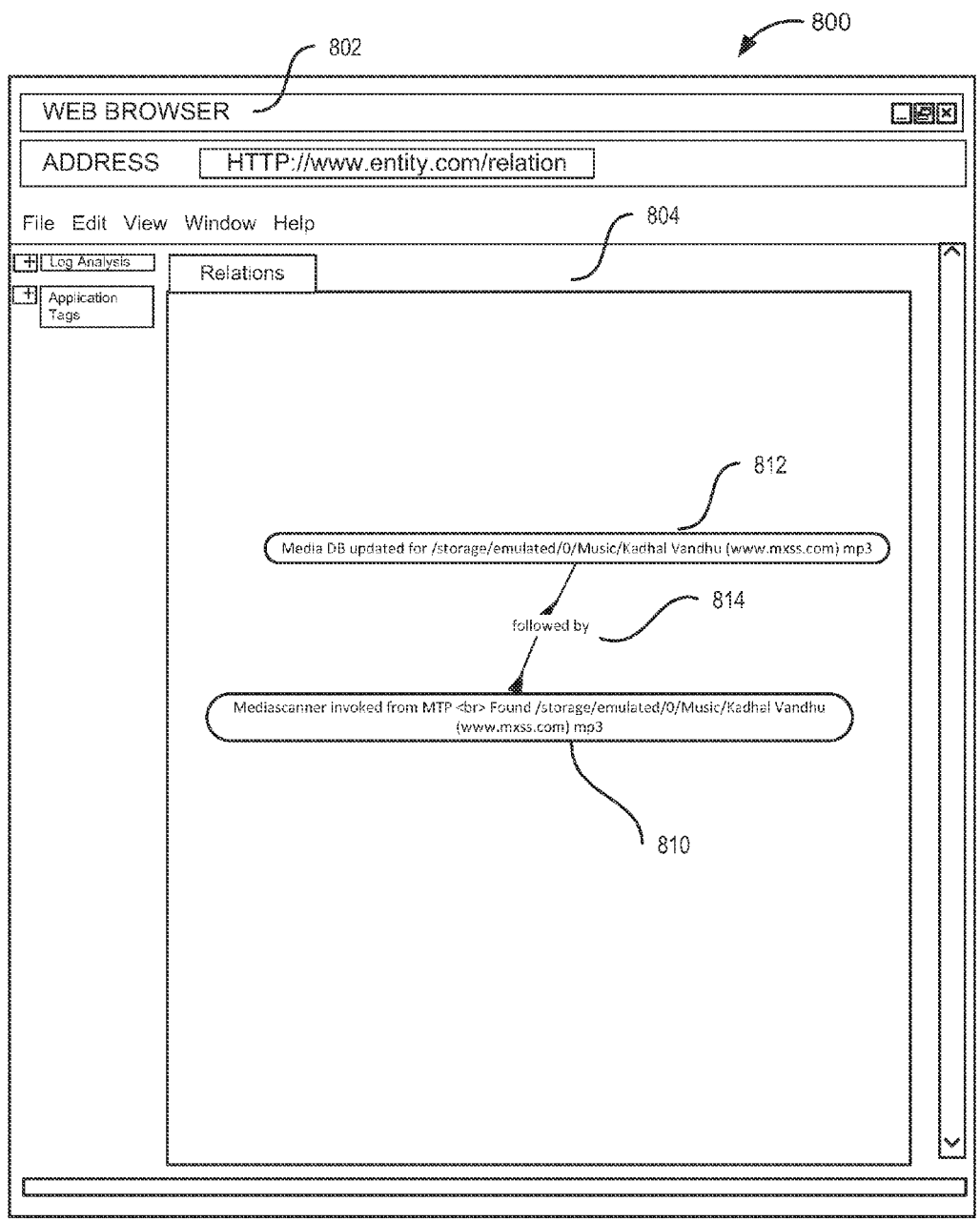
Figure 9:
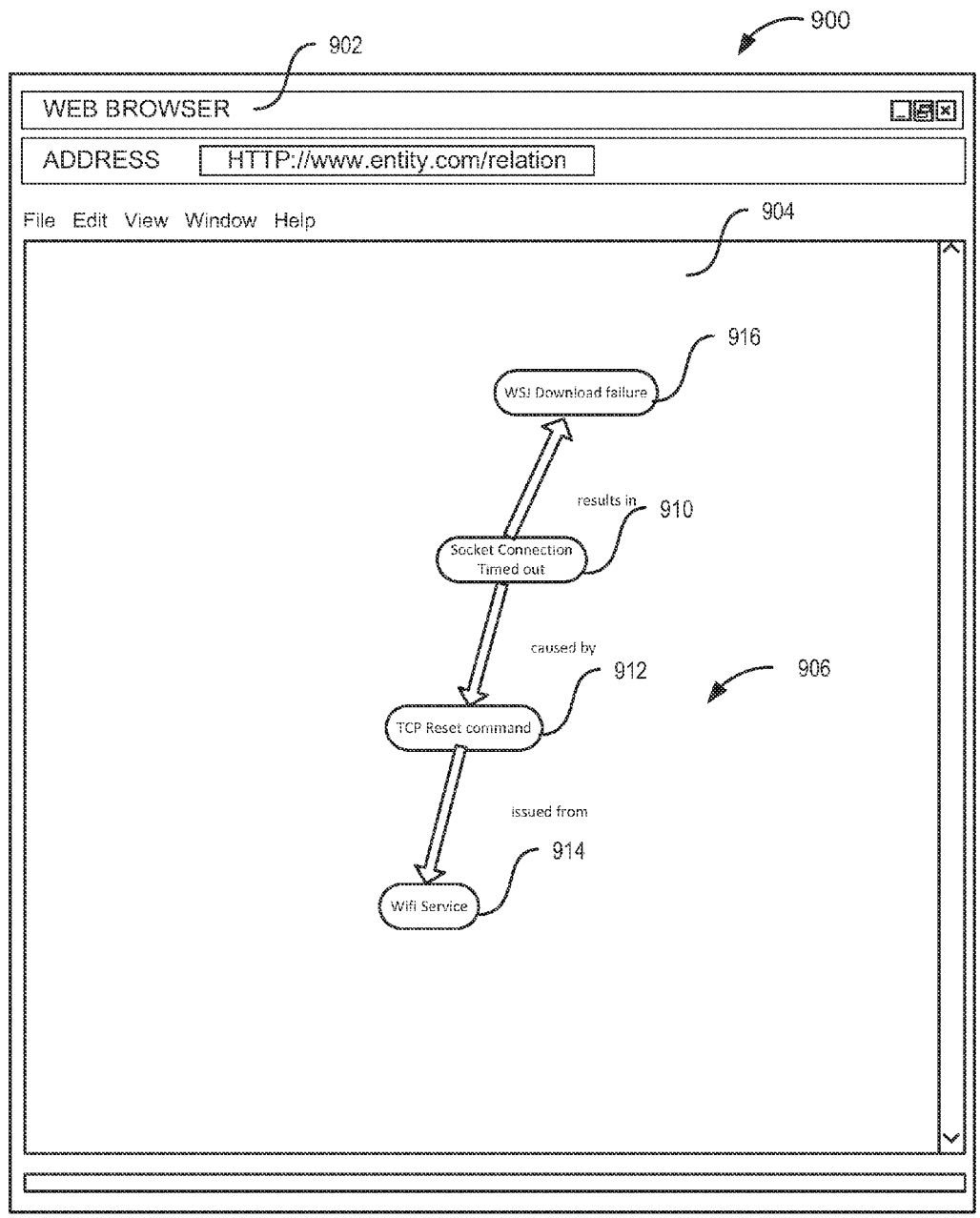

FIGS. 8 and 9 illustrate examples 800 and 900 of the diagnostic information application 150's UI components configured to provide a view of relationships associated with the patterns. The examples 800 and 900 may include a Web browser window 802 and 902 respectively that may render the illustrated component of the UI of the diagnostic information application 150 in a Web-based implementation. The example 800 may include a display panel 804 that may render the patterns or event descriptions associated with the patterns 810 and 812. In the illustrated example, the descriptions 810 and 812 correspond to the descriptions 706 and 708 of FIG. 7. The example may further include a relationship between the events corresponding to the descriptions 810 and 812, e.g., the relationship 814 "followed by."

In some embodiments, the relationships may include the relationship between the events corresponding to the descriptions that may have been entered by a SME and stored by the diagnostic information application 150. In some embodiments, the relationship may include additional relationships indicating connections among the patterns that were identified as related to the matched pattern, and the matched pattern. As discussed above, such relationships across the patterns in the diagnostic information may be generated using, for example, ontology rules. The example 900 of FIG. 9 illustrates a display panel 904 rendering an example view of relationships 906 between different computer event descriptions indicated by numerals 910, 912, 914, and 916. As shown, the event 910 was caused by the event 912 that was issued by the computer component 914, and resulted in event 916.

Note that not all events 910, 912, 914, and 916 may have patterns that were found matching to the log lines of the log file being investigated. The patterns corresponding to some of these events and their relationships may have been entered into the diagnostic information as a result of multiple previous investigations and did not have a matched log lines and corresponding events in the log file. For example, "Socket connection timed out" 910 in relation to "WSJ download failure" 916 may have been entered into diagnostic information as a result of an investigation of a prior issue with one computing device. "Socket connection timed out" 910 in relation to "TCP reset command" 912 may have been entered as a result of another investigation of a different issue (perhaps with another computing device). "TCP reset command" 912 in relation to "Socket connection timed out" 910 may have been entered as a result of yet another investigation of yet another computer issue. Assume just one of the above events may have a pattern that was found as matching one of the log lines of the investigated log file, for example, "Socket connection timed out" 910. Bringing up all related patterns and associated relationships from prior investigations of different issues may help the user determine a root cause of the event (in this case, connection issue) "Socket connection timed out" shown in the log file that the user may be investigating.

Figure 10:
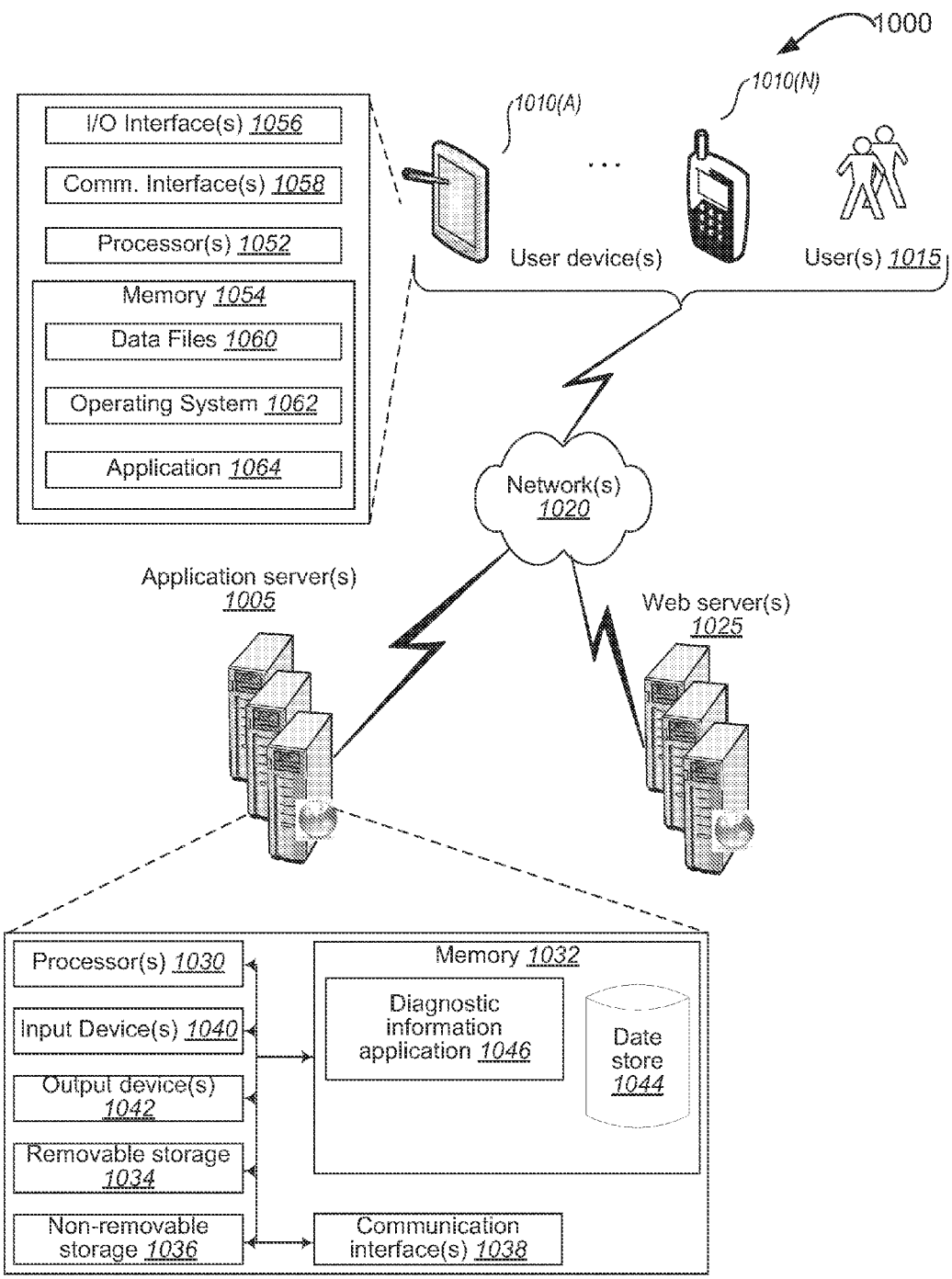
FIG. 10 illustrates an exemplary computing environment in which embodiments described in the present disclosure may be implemented in accordance with various embodiments.

FIG. 10 illustrates an example of an environment 1000 for implementing aspects in accordance with various embodiments. As will be appreciated, although a Web-based environment is used for purposes of explanation, different environments may be used, as appropriate, to implement various embodiments. The environment 1000 may include one or more electronic user computing devices and/or diagnostic computing devices 1010(A)-1010(N), which may include any appropriate device operable to send and receive requests, messages, or information (e.g., log files) over an appropriate network 1020 and convey information back to a user 1015 of the device, such as the computing devices 102, 103 described in greater detail in reference to FIG. 1. Examples of such computing devices may include smartphones, personal computers, cell phones, handheld messaging devices, laptop computers, set-top boxes, personal data assistants, electronic book readers, tablets computers, and the like.

The computing devices 1010(A)-1010(N) may include a processor 1052 and memory 1054 for storing processor-executable instructions, such as data files 1060, operating system 1062, and one or more applications 1064, such as diagnostic information application 150 or elements of the diagnostic information application 150 (e.g., UI 160) described in reference to FIGS. 1-9. The operating system 1062 may be a general purpose operating system such as a Microsoft Windows® operating system, a UNIX® operating system, a Linux® operating system, or an operating system specifically written for and tailored to the computing devices 1010(A)-1010(N).

The devices 1010(A)-1010(N) may further include at least one or both of the following elements: input/output interface 1056 and communication interface 1058. The communication interface 1058 may enable the computing devices 1010(A)-1010(N) to communicate data, control signals, data requests, and other information with other resources including computers, data sources, storage devices, and the like, on a computer network 1020 such as the Internet, via wired or wireless connections. The input/output interface 1056 may enable the computing devices 1010(A)-1010(N) to obtain data input from a variety of devices including, but not limited to, a digital pen, a touch screen, a keyboard, a mouse, a scanner, and the like. In addition to the illustrative components described above, a display interface (not shown) may be used for outputting display information to a computer user. Typically, the display information may be outputted by the display interface via a display device (e.g., a CRT monitor, an LCD screen, a touch screen, a television, an integrated screen or sets of screens, etc.).

The network 1020 may include any appropriate network, including an intranet, the Internet, a cellular network, a local area network, a personal network, or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof.

The memory 1054 may generally comprise RAM, ROM, and/or other permanent memory. Thus, in addition to storage in read/write memory (RAM), programming instructions may also be embodied in read-only format, such as those found in ROM or other permanent memory.

The illustrative environment 1000 may include at least one application server 1005 including, or associated with, one or more processors 1030, input devices 1040, output devices 1042, removable storage 1034, and non-removable storage 1036 that may be connected to a communication interface 1038 and memory 1032. The memory 1032 may include, but is not limited to, diagnostic information application 1046 similar to the diagnostic information application 150 described above in reference to FIGS. 1-9.

The memory 1032 may further include a data store 1044 configured to store diagnostic information as described above in reference to the diagnostic information repository 116 of FIG. 1. As used herein, the term "data store" may refer to any device or combination of devices capable of storing, accessing, and retrieving data, which may include any combination and number of data servers, databases, data storage devices, and data storage media, in any standard, distributed, or clustered environment. It should be understood that there may be many other aspects that may need to be stored in the memory 1032, such as UI-related information or access right information, which may be stored in any of the above-listed mechanisms as appropriate.

The application server 1005 may include any appropriate hardware and software for integrating with the data store 1044 as needed to execute aspects of one or more applications for the computing devices 1010(A)-1010(N), handling a majority of the data access and business logic for an application. The application server 1005 may provide access control services in cooperation with the data store 1044, and is able to generate content such as text, graphics, audio, and/or video to be transferred to a viewer, which may be served to the viewer by the Web server in the form of HTML, XML, or another appropriate structured language in this example. The handling of all requests and responses, (e.g., requests for user records and the records provided in response) as well as the delivery of content between the user and diagnostic computing devices 1010(A)-1010(N) and the application server 1005 may be handled by the Web server 1025.

It should be understood that the Web and application servers 1025 and 1005 are not required and are merely example components, as the applications discussed herein may be executed on any appropriate device or host machine as described elsewhere herein. Each server 1005 or 1025 may include an operating system that may provide executable program instructions for the general administration and operation of that server, and may include a computer-readable medium storing instructions that, when executed by a processor (e.g., 1030) of the server, may allow the server to perform its intended functions. Suitable implementations for the operating system and general functionality of the servers are known or commercially available, and are readily implemented by persons having ordinary skill in the art, particularly in light of the disclosure herein.

The environment 1000 may include a distributed computing environment utilizing several computer systems and components that may be interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature, and not limited to the scope of the disclosure.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. A computer-implemented method for assisting diagnosis of a computer issue from a log file, comprising:
   receiving, by a diagnostic computing device, a log file having multiple log lines, including a log line indicating an event associated with a component of a user computing device;
   matching, by the diagnostic computing device, one or more of a plurality of patterns to at least a portion of the log line, to identify a matched pattern, wherein the plurality of patterns are included in diagnostic information that is accessible by the diagnostic computing device, and wherein the matched pattern is related to at least another pattern of the plurality of patterns;
   identifying, by the diagnostic computing device, additional ones of the patterns that are related to the matched pattern, based in part on relationship descriptions of the patterns included in the diagnostic information and on the related another pattern;
   generating, by the diagnostic computing device, additional relationship descriptions indicating relationships among some of the additional patterns and the matched pattern; and
   generating, by the diagnostic computing device, the log file for user access, including an indicia denoting the event of the log line as having patterns and the additional relationship descriptions available for viewing to assist in diagnosing the log file associated with the user computing device.

2. The computer-implemented method of claim 1, wherein the generating is based on applying ontology rules defining the relationships between patterns to the matched pattern and the additional patterns, the ontology rules being accessible by the diagnostic computing device.

3. The computer-implemented method of claim 2, wherein the applying ontology rules includes:
   identifying, by the diagnostic computing device, a common pattern that relates to the matched pattern and at least one of the additional patterns;
   identifying, by the diagnostic computing device, relationship descriptions defining relationships between the common pattern and the matched pattern and between the common pattern and the at least one of the additional patterns; and
   providing, by the diagnostic computing device, a relationship description between the matched pattern and the at least one of the additional patterns based on the identified relationship descriptions and the relationships defined by the ontology rules.

4. The computer-implemented method of claim 1, wherein the identifying additional ones of the patterns related to the matched pattern includes determining, by the diagnostic computing device, which of the patterns are related to the matched pattern or to the related another pattern, based on corresponding relationship descriptions associated with the patterns.

5. A computer-implemented method for providing diagnostic information, comprising:
   matching, by a computing device, a pattern to a log line included in a log file accessible by the computing device, to determine that there is a match between the at least a portion of a log line and the pattern, wherein the pattern is one of a plurality of patterns included in a collection of diagnostic information accessible by the computing device, the diagnostic information including one or more relationship descriptions between the pattern and one or more other patterns of the plurality of patterns; and
   generating and storing, by the computing device, one or more additional relationship descriptions indicating relationships between the matched pattern and at least some other patterns included in the diagnostic information.

6. The computer-implemented method of claim 5, further comprising: obtaining, by the computing device, the log file including multiple log lines, each log line indicating an event associated with a component of the computing device or another computing device.

7. The computer-implemented method of claim 5, further comprising: associating, by the computing device, the additional relationships with the log line corresponding to the matched pattern; and providing, by the computing device, the log file including the associated additional relationships for display via a user interface provided by the computing device.

8. The computer-implemented method of claim 7, further comprising: enabling, by the computing device, a selection of the at least one log line via the user interface, wherein the selection causes the additional relationships to be displayed via the user interface.

9. The computer-implemented method of claim 5, wherein the generating includes:
   identifying, by the computing device, the at least some other patterns corresponding to the matched pattern; and
   applying, by the computing device, ontology rules to the relationships associated with the identified other patterns, to generate the additional relationships.

10. The computer-implemented method of claim 9, wherein the ontology rules are configured to define the relationships based at least in part on one or more of a transitory or ancestral dependency between at least some of the relationships.

11. The computer-implemented method of claim 10, wherein the applying includes:
    identifying, by the computing device, a common pattern that relates to the matched pattern and at least one of the additional patterns;
    identifying, by the computing device, relationship descriptions defining relationships between the common pattern and the matched pattern and between the common pattern and the at least one of the additional patterns; and
    providing, by the computing device, a relationship description between the matched pattern and the at least one of the additional patterns based on the identified relationship descriptions and the relationships defined by the ontology rules.

12. The computer-implemented method of claim 5, further comprising: receiving, by the computing device, input provided by multiple users, the input including data entries providing the plurality of patterns and relationships between at least some of the plurality of patterns.

13. A computer system for providing diagnostic information, the system comprising:
- at least one processor; and
- at least one memory having processor-executable instructions that, in response to execution by the at least one processor, cause the computer system to:
  - identify a log line in a log file including multiple log lines that includes at least a portion thereof that matches a pattern of multiple patterns included in a collection of previously accumulated diagnostic information that is accessible by the computer system, the diagnostic information including one or more relationship descriptions between the pattern and one or more other patterns of the plurality of patterns; and
  - generate additional relationship descriptions associated with the matched pattern, based in part on the relationship descriptions included in the diagnostic information, the additional relationships indicating relationships between the matched pattern and at least some other patterns included in the diagnostic information.

14. The computer system of claim 13, wherein the processor-executable instructions further cause the computer system, in response to execution by the processor, to associate the additional relationships with the identified log line and to provide the log file with the associated additional relationships for user access via a user interface associated with the computer system.

15. The computer system of claim 13, wherein the processor-executable instructions that cause the computer system to generate the additional relationships further cause the computer system, in response to execution on the processor, to identify the at least some other patterns corresponding to the matched pattern and to apply ontology rules to relationships between the matched pattern and the at least some other patterns.

16. The computer system of claim 13, wherein the diagnostic information is stored at a data repository accessible by the computer system.

17. A non-transitory computing device-readable medium comprising computing device-executable instructions for providing diagnostic information, wherein the instructions, in response to execution by a computing device, cause the computing device to:
- identify a log line in a log file including multiple log lines that includes at least a portion thereof that matches a pattern of multiple patterns included in diagnostic information that is accessible by the computer system, the diagnostic information including one or more relationship descriptions between the pattern and one or more other patterns of the plurality of patterns; and
- generate additional relationship descriptions associated with the matched pattern, based in part on the relationship descriptions included in the diagnostic information, the additional relationship descriptions indicating relationships between the matched pattern and at least some other patterns included in the diagnostic information.

18. The non-transitory computing device-readable medium of claim 17, wherein the computing device-executable instructions further cause the computing device, in response to execution, to update the log file to include the additional relationship descriptions in association with the log line corresponding to the matched pattern.

19. The non-transitory computing device-readable medium of claim 18, wherein the computing device-executable instructions further cause the computing device, in response to execution, to provide the updated log file for display in at least one of a timeline view or a log view.

20. The non-transitory computing device-readable medium of claim 17, wherein the diagnostic information further includes one or more tags associated with at least some of the patterns, each tag including indicia denoting an event described by the associated pattern.

21. The non-transitory computing device-readable medium of claim 20, wherein the diagnostic information further includes one or more descriptions of events associated with the patterns, wherein each event is associated with one of a plurality of computing devices, wherein the diagnostic information is obtained from the plurality of computing devices.

22. The non-transitory computing device-readable medium of claim 17, wherein the computing device-executable instructions further cause the computing device, in response to execution, to obtain the log file from another computing device.

* * * * *